May 14, 1929.   G. R. YOUNG   1,713,414
STARTING BOX FOR DOG RACE TRACKS
Filed Sept. 27, 1926   2 Sheets-Sheet 2
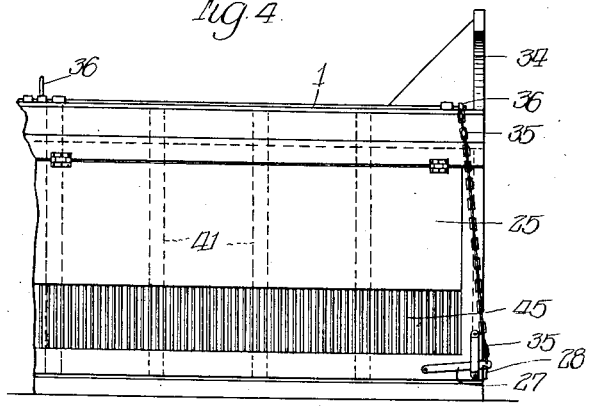
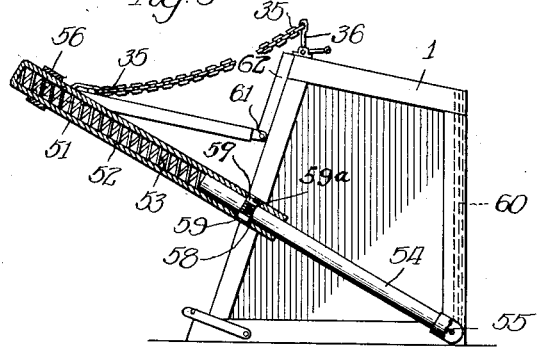
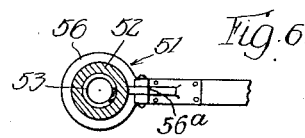
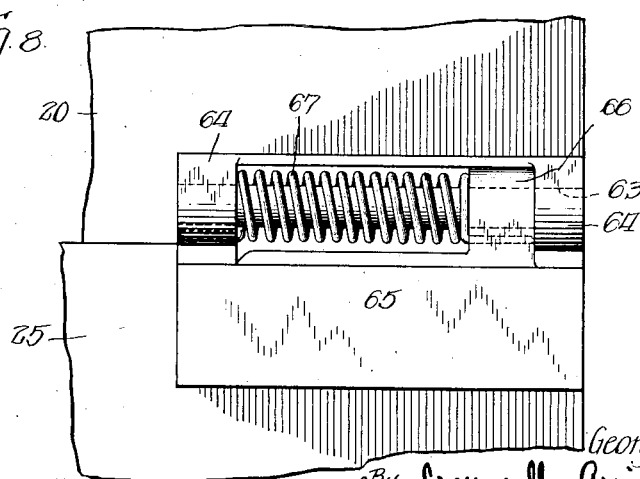
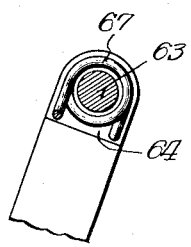
Inventor:
George Robert Young,
By Cromwell, Greist & Warden atty.

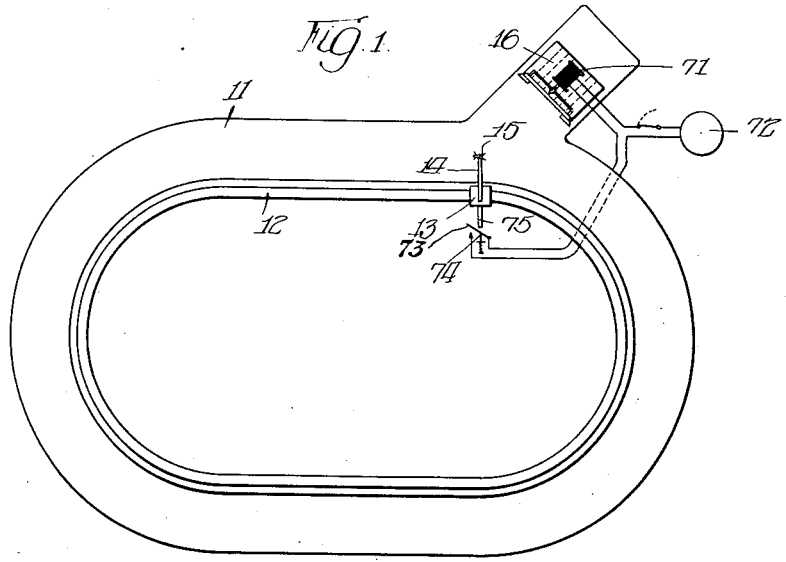
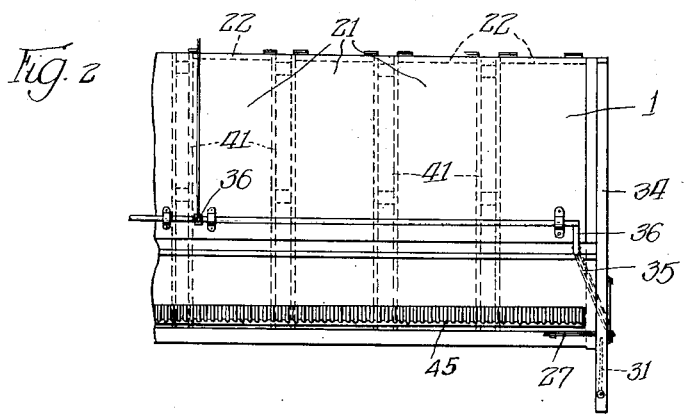
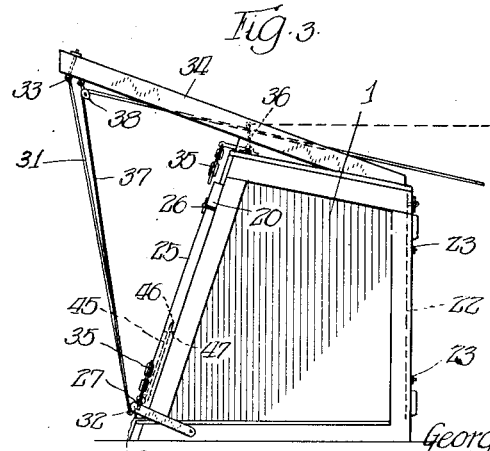

Patented May 14, 1929.

1,713,414

UNITED STATES PATENT OFFICE.

GEORGE ROBERT YOUNG, OF NEVADA, MISSOURI, ASSIGNOR TO ELECTRIC HOLDING CORPORATION, OF CHICAGO, ILLINOIS, A CORPORATION OF DELAWARE.

STARTING BOX FOR DOG RACE TRACKS.

Application filed September 27, 1926. Serial No. 137,849.

My invention relates to starting boxes for dog race tracks, and it relates particularly to starting boxes in which a plurality of stalls for individual dogs are so arranged beside each other as to permit quick simultaneous release of all dogs that are to participate in a race.

In training racing dogs by means of a lure carried in front of the dogs along a suitable racing track, the dogs are held in a suitable cage near the race track, and, as the lure is being driven in front of the cage holding the dogs, a door in the cage is being opened permitting the dogs to run behind the lure to test and improve their racing qualities.

It is clear that the conditions under which the dogs are made to leap out of the cage in order to run behind the lure are very important, both in respect to the way in which the race is being started and the degree to which interference between the individual dogs is avoided, and also in respect to the safety of the dogs against injury due to crowding, hitting against the solid parts of the cage, and the like.

In the prior-art construction of racing cages little or no consideration was given to the above mentioned conditions when releasing the dogs from the cage, and as a consequence, apparently inconsistent behavior of the same dog during different races have been ascribed to the qualities of the dogs rather than to the essentially extraneous circumstances in releasing the dogs which, while affecting their action during the race tended to distort the true measure of their racing qualities.

According to my invention erratic handicaps heretofore imposed on the individual racing dogs while releasing the same from the starting cage are removed, and all the dogs are released with substantially the same chances for the race, by so scientifically shaping the starting box or cage as to release all the dogs in substantially the same position ready to leap behind the passing lure. Relatively large spacings are provided between the individual stalls of the starting cage to prevent crowding of the dogs during the initial part of the race. Furthermore, I provide special means for speedily opening the front releasing door of the cage.

The foregoing and other novel features of my invention will best be understood from the accompanying drawings in which, Fig. 1 is a plan diagrammatic view of a race track having at one portion thereof a starting box which embodies one form of my invention;

Fig. 2 is a plan view of the starting box made according to one form of my invention;

Fig. 3 is a side elevational view of the starting box shown in Fig. 2;

Fig. 4 is a front elevational view of the starting box, with the door-elevating means removed for clearness in illustration;

Fig. 5 is a view similar to Fig. 3 showing box embodying another form of my invention;

Fig. 6 is a fragmentary elevational view showing the mounting of the spring release housing shown in Fig. 5;

Fig. 7 is a front elevational view of a spring hinge construction utilized in the form of my invention shown in Fig. 5; and Fig. 8 is a side elevational view of the hinge structure shown in Fig. 7.

Referring to Fig. 1, a racing course in the shape of an oval track 11 has a rail track 12 built along the interior side thereof. A carriage 13 is driven at high speed along the rail track 12 and carries on a laterally projecting rod 14, a lure 15, in the shape of a rabbit, or the like, so that dogs released on the track behind the lure will be induced to race thereafter.

In order to simultaneously release the dogs that are to participate in the race behind the lure, a starting cage or box 16 is placed at one side of the track for holding the dogs until the carriage 13 with the lure 15 carried thereby passes in front of the cage 16. The dogs are then released at a suitable moment and permitted to run behind the lure.

The form of my improved starting box which is shown in Figs. 2 to 4, comprises a substantially box-like framework or structure 1 made of timber posts, or the like, the framework being closed at the top as well as at the bottom by boards to constitute a substantially complete enclosure of the interior thereof. The interior of the box-like structure is subdivided into a plurality of transversely disposed stalls 21 for individually holding therein the several dogs that are to participate in the race. The back sides of the individual stalls are provided with doors 22 which may be opened for placing or loading the dogs in the stalls, the doors being hinged at the upper end thereof, and held in closed position by means of suitable cleats 23. The upper side of the box-like structure is somewhat slanted to provide a greater height of the stalls at the front end thereof.

The front side of the stalls is enclosed by wall 23 carrying at its lower end a barrier door 25 extending throughout the full length of the starting cage so that when the door is opened by being swung upwardly around hinges 26 all of the stalls will be simultaneously opened and the dogs released for the race.

The door 25 is held in closed position by means of latches 27 suitably pivoted at the lower end of the door to co-operate with catch members 28 secured to the side walls of the cage. In the position shown in Fig. 3, the engagement of the latch with the catch 28 will prevent the door from being swung open around the hinge 26 at the upper side thereof. To secure prompt opening of the door when the latch 27 is released, tension springs 31 are connected between suitable eye-bolts 32 at the lower side of the door and eyebolts 33 at the front end of cross-pieces 34 mounted at the top of the cage to project in front of the cage door 25. To open the door and release the dogs the latches 27 are pulled upwardly by means of tripping chains 35 which are operated through a bell crank lever 36 which is actuated by a starting operator. The bell crank lever 36 is suitably mounted for rotary swinging movement on the upper slanted side of the starting cage.

The action of the spring 31 in opening the cage door may be assisted by an additional pull on a rope 37 which is lead from the back of the cage through pulleys 38 mounted at the end of the upper cross-beams 34 to the lower end of the barrier door, 25.

One of the features of my invention is the proper spacing of the dogs in the individual stalls and the provision of sufficient clearance between the dogs at the moment when they escape from the cage. To this end I make partitions 41 of relatively large width between the individual stalls, there being usually a double wall separating the dogs to, as far as possible, entirely remove extraneous influences and disturbances from the individual dogs. It is to this end also that the stalls are formed with substantially full walls in order to prevent the noises and excitement of the crowds accumulated in the neighborhood of the racing tracks, from being communicated to the dogs.

In the preferred construction of my invention the thickness of the walls separating the individual stalls is about one-fourth of the width of the stalls, and I have found that this spacing is sufficient to prevent the dogs from crowding into each other when released from the cage. It is, of course, clear that the actual width of the stalls depends on the kind of dog that is to be housed therein. In the case of the grey hounds, which usually run in the races, a stall width of about 16 inches has been found desirable.

As shown in Fig. 3, the upper wall of the stalls is somewhat raised toward the front so as to permit the dog to stand in upright position without discomfort. The front side of the cage with the hinged door is not disposed vertically as in the prior-art starting boxes, but is slanted backwardly, enclosing an acute angle of approximately 70 to 75 degrees with the base wall of the stalls. The front door 25 itself does not extend through the full height of the front wall, but is only so high that when the dog is bent forwardly in the position ready to jump out of the cage, it will conveniently pass through the opening provided by the door when it is swung upwardly.

While, as pointed out above, substantially all the walls enclosing the cage and the intermediate walls between the individual stalls are substantially solid so as to practically isolate each dog from the outer influences, I provide at the lower end of the slanted barrier door 25 a grating 45 which permits the dogs in the individual stalls a view in the direction in which they are to escape from the stall to run behind the moving lure. The grating is about 12 inches high, and may be made of aluminum rods ⅜th of an inch wide 46, secured parallel to each other along a suitable opening 47 in the door. The individual aluminum rods 46 are spaced from each other about one-half inch. This small clearance between the rods constituting the grating has been found sufficient to permit the dogs a view in front of the cage.

The foregoing construction of the front wall of the starting box and of the hinged door is particularly adapted to carry out the objects discussed hereinabove, namely, to concentrate the attention of all of the dogs that are to participate in the race on one purpose only, namely, on the lure that they are to race after, and furthermore, to induce all the dogs to assume practically the same position in leaping out from the cage upon opening of the door.

When, namely, the lure is passed in front of the cage, the dogs which are individually enclosed in the stalls or compartments on all sides, with a free view only through the grating at the lower side of the front door, are immediately attracted by the passing lure and bent forwardly, bringing their heads near the openings in the grating while assuming at the same time the natural position preparatory to jumping out of the cage. Thus, all of the dogs are uniformly induced to assume like positions in the stalls which, as pointed out above, is so important in arriving at true evaluations of their racing qualities. It is with this end in view also that the inclination of the door is chosen in accordance with the directions given above, as the angle of 70 degrees corresponds approximately to the position which the face of the dog assumes when preparing to escape from the cage.

The relatively reduced height of the front door is another feature which characterizes my improved starting box and constitutes a considerable step in advance over the prior-art construction. I have found, namely, that the speed with which the door is being opened is of great consequence on the way in which the dogs start to run on being released from the cage, and that it is very desirable to have the door open as quick as a flash. By making the door extend only over so much of the height of the front wall as is necessary for permitting the dog to clear the opening in the front wall without colliding with the rigid portions thereof, I reduce the mass which is to be accelerated on opening the door to a minimum, while the additional space above the joint of the door to the upper portion of the front wall 20 provides sufficient space for housing the dogs in upstanding position.

In the construction of my starting box shown in Figs. 1 to 4, the tension spring 31 for opening the door is made of the airplane rubber cord which has been found very suitable for this purpose. As in all other spring constructions, however, the door, upon being unlatched by means of the bell crank lever 36 and the trip chain 35, and swinging upwardly, giving momentarily full clearance for the dogs, has a certain amount of rebound, causing the door to swing downwardly as if to close the opening in the cage. It is in order to prevent any injury to the dogs by the rebound movement of the door that I provide the additional pulling rope 37, for holding the door in upper position after having been pulled open by the spring 31.

In Figs. 5 to 8 I have shown another form of my invention which comprises various improvements in the construction of the stalls and the barrier door with improved spring means for quickly swinging the door from closed to open position. The improved construction is, at the same time, of better outer appearance. Since the starting cages are used on race tracks in the sight of the public, those operating race tracks are constantly endeavoring to make the various accessories used in the races as pleasant in appearance as possible.

As shown in Fig. 5, I provide in place of the upper transverse beams 34 projecting in front of the starting cage to hold the upper end of the tension springs used in the construction shown in Figs. 1 to 4, a special spring mechanism 51 which occupies relatively little space, and yet is so arranged as to provide even stronger spring action than the tension spring construction used in the former device. The spring device 51 comprises a tubular spring housing member 52 in the interior of which is mounted a compression spring 53 that may be compressed by a piston-like member 54 adapted to fit into the interior of the tube 52 and to be slid thereinto for compressing the spring 53. The piston member 54 of the spring device has, at its free end, a socket 55, whereby it is pivotally held to the back end corner on the end walls of the cage. The tubular member 52 of the spring device is similarly connected by means of a suitable socket 56 to the lower corner of the front door, a pivotal joint 56ª being provided between the socket and the door to permit swinging motion therebetween. When the door is closed, the tubular member 52 slides over the piston member 54 compressing the spring 53 in the forward end of the tubular member 52, thus storing energy in the compressed spring. On releasing the door by means of a latch mechanism, which may be similar to that shown in Fig. 3, the energy stored in the compression spring 53 will expel the piston 54 from the interior of the tube and by this action cause the door which is pivotally held by the tube 52 to be quickly swung upwardly around the upper door hinge 61. In order to prevent the tube 52 from being pulled entirely away from the piston 54, I provide suitable stops limiting said movement.

In the construction of such movement limiting means shown in the drawings, there is provided two latch members 59 which are mounted in a suitable slot in the piston 54 and are pressed radially outwardly by a suitable spring 58 into engagement with slots 59ª near the lower end of the tube 52, whereby to stop the forward movement of the door and also automatically lock the piston 54 with respect to the tube member 52 when the door has been sprung open. This arrangement secures automatic locking of the door when opening the same, and also avoids the danger of premature reclosing of the cage by the rebounding door. To release the latch members 59, it is merely necessary to press the same together.

The back doors to the individual stalls of the construction shown in Fig. 5 are not hinged, as in the construction shown in Fig. 3, but are arranged to be slid in upwardly extending grooves 60 at the back end of the side walls of the stalls.

Instead of using a compression spring structure 51 for opening the door, I may combine the spring means for opening the door with the hinges around which the upper end of the door is being swung open. In the construction shown in Fig. 5 I have illustrated such hinge 61, the details of which are shown in Figs. 7 and 8. The hinge comprises a pin or pivot 63 which is held on brackets 64 at the lower side of the upper front wall 62. A suitable socket member 65 which is secured to the upper doorside has a socket 66 fitting over the pin 63 to permit pivotal movement of the door around the pin. Laterally beside the socket 66 there is mounted a coil spring 67, or other suitable torsion spring, which is so held between the socket member 65 of the hinge and the pin bracket 64, as to swing the door upwardly to open the same. As in the compression spring device 51, the closing of the door places the coil spring 67 under tension, the stored energy in the spring serving subsequently to swing the door upwardly around the pivots 63 for releasing all dogs. By providing sufficient spring members 67 the opening of the door will take place very quickly, the spring construction in itself being substantially entirely hidden, giving the starting box a very pleasant external appearance.

The present device provides also special means for definitely co-relating the movement of the lure with the release of the dogs from the starting cage. Heretofore, a starter used to manually operate the latch which released the door, and it depended on his personal judgment and skill to determine just how much time was interposed between the movement of the lure 15 in front of the cage 16 and the opening of the door to release the dogs. It very often happened that the door was released too soon, and as a consequence the dogs would be so close behind the lure as to obtain a hold of the same, entirely destroying the race. At other times, the door would be opened too late, and as a consequence little inducement would be offered to the dogs to run after the lure. According to the present invention the opening of the door is automatically timed with respect to the movement of the lure, thus avoiding inaccuracies inherent in the manual operation of the prior-art starting boxes.

The automatic operation of the box as shown in Fig. 1 may be carried out for instance by energizing a latch-operating magnet 71 from a suitable electric current source 72 through the operation of a switch 73 which is normally held in open position by biasing means 74. The magnet may act on the door latches through the bell crank lever 36, and the auxiliary pull rope 37 may or may not be used as desired with the switch open, the latch-operating magnet 71 is deenergized and the door remains closed.

The carriage 13 which propels the lure is provided with a suitable actuating member 75 arranged to momentarily close the switch 73 when passing at a predetermined point of the track near the place where the cage with the dogs is placed. As the actuating member 75 closes the switch 73, the latch-operating magnet 71 becomes energized and the cage door is then sprung open releasing the dogs.

By suitably positioning the switch 73, the time difference between the moment when the lure passes a particular point on the track, and the moment when the dogs are released may be accurately determined, and the operation of the starting box may be carried out automatically without reliance on manual operation. Instead of the electric interlocking mechanism for operating the starting box in response to the movement of the lure shown in Fig. 1, any other automatic interlocking means may be utilized.

My invention may be embodied in a variety of modifications other than those specifically shown and described, and I desire that the scope of my invention shall not be limited except as indicated in the appended claims.

I claim as my invention:

1. In a starting box for racing dogs, a plurality of box-like compartments disposed beside each other, individual rear doors for each of said compartments, a single door in front of said compartments for simultaneously releasing the dogs individually housed therein, said compartments being separated by partitions, having sufficient width at the front end to secure relatively wide clearance between the escaping dogs, the walls of the compartments substantially entirely isolating the individual dogs from the surroundings, the front wall of said compartments being so inclined as to conform substantially to the position of the dogs when ready to escape from the chambers, the lower side of the door in front of said compartments having perforations permitting said dogs to have a view in the direction in which they are to race.

2. In a racing track on which dogs are induced to run behind a lure, a starting cage for simultaneously releasing the dogs to run behind said lure comprising a substantially elongated box structure having a substantially horizontal bottom wall, a top wall above said bottom wall, a back wall, and a front wall, said box structure being subdivided along its axis into a plurality of stall compartments extending between the back and front wall, said back wall having doors for each compartment to permit the dogs to be individually loaded thereinto, said front wall having a door common to all of said compartments for simultaneously releasing the dogs therefrom, said front wall being slanted backwardly to enclose an acute angle with the bottom wall of the stalls.

3. In a racing track on which dogs are induced to run behind a lure, a starting cage for simultaneously releasing the dogs comprising an elongated box structure having a substantially horizontal bottom wall, a top wall above said bottom wall, a back wall, and a front wall, said box structure being subdivided along its axis into a plurality of stall compartments extending between the back and front wall, said back wall having doors for each compartment to permit the dogs to be individually loaded thereinto, said front wall having a door common to all of said compartments for simultaneously releasing the dogs therefrom, said front wall being slanted backwardly to enclose an acute angle with the bottom wall of the stalls, the walls enclosing the individual dogs in said compartments entirely isolating and separating said dogs from the exterior, and having perforations solely at the lower end of the front door to permit the individual dogs to have a view only in the direction in which they are to race on the track.

4. In a racing ground on which dogs are induced to run behind a lure, a starting cage for simultaneously releasing a plurality of dogs behind said lure, said cage comprising a plurality of distinct compartments for individually housing a plurality of dogs that are to be released, and door means for simultaneously releasing said dogs, said compartments constituting substantially complete enclosures around the individual dogs isolating the same from external view on all sides, and from each other, and said door means having sight openings through only the lower portions thereof, whereby to induce the dogs to properly position themselves in the compartments prior to the opening of said door means.

5. In a starting box for racing dogs, an elongated box structure, a plurality of partitions longitudinally subdividing said structure into a plurality of compartments for individually housing the dogs, rear doors individual to each compartment, a single front door hinged at its upper end to simultaneously open said compartments for releasing the dogs, and compression spring means acting on the lower side of said front door to swing the same upwardly for releasing said dogs, said spring means comprising a tubular spring housing member, a coil spring mounted in said tubular housing member, and arranged to be compressed therein, a piston member mounted for slidable movement in said housing member for compressing said spring, said members being so joined to the lower end of said door and to said box structure, respectively, as to swing said door upwardly for releasing the dogs housed in said compartments, and means associated with said spring device for automatically locking said door in open position.

6. In a starting box for racing dogs, a plurality of box-like compartments disposed beside each other, closure means at the rear of each of said compartments for permitting the dogs to enter the same, and closure means at the front of each of said compartments for permitting the dogs to leave the same simultaneously, said compartments being entirely isolated from each other by hollow imperforate partitions having sufficient width at the front to secure relatively wide clearance between the dogs as they leave the compartments.

7. In a starting box for racing dogs, a plurality of box-like compartments disposed beside each other, closure means at the rear of each of said compartments for permitting the dogs to enter the same, and closure means at the front of each of said compartments for permitting the dogs to leave the same simultaneously, said compartments being separated by double imperforate partitions extending to a height above the heads of the dogs and having an over-all width of several inches at the front to provide sufficient side clearance between the dogs when leaving the compartments.

In testimony whereof I have hereunto signed my name.

GEORGE ROBERT YOUNG.